United States Patent [19]

Nakajima et al.

[11] 4,082,321
[45] Apr. 4, 1978

[54] SEPARATION-PREVENTING PIPE JOINT CONSTRUCTION

[75] Inventors: Toshi Nakajima; Takao Sagara, both of Amagasaki; Shohachiro Hagio, Nishinomiya, all of Japan

[73] Assignee: Kubota, Ltd., Osaka, Japan

[21] Appl. No.: 686,546

[22] Filed: May 14, 1976

[30] Foreign Application Priority Data

| May 16, 1975 | Japan | 50/59087 |
| Mar. 16, 1976 | Japan | 51/28775 |
| Mar. 16, 1976 | Japan | 51/28776 |
| Mar. 16, 1976 | Japan | 51/28777 |

[51] Int. Cl.² .................................. F16L 35/00
[52] U.S. Cl. .................................... 285/39; 285/321
[58] Field of Search ............... 285/175, 337, 171, 413, 285/321, 397, 421, 39; 403/344, 326

[56] References Cited

U.S. PATENT DOCUMENTS

| 3,177,019 | 4/1965 | Osweiler | 285/288 |
| 3,521,911 | 7/1970 | Hanes et al. | 285/39 X |
| 3,530,685 | 9/1970 | Ehret | 285/321 X |
| 3,540,224 | 11/1970 | Pogonowski | 285/321 X |
| 3,712,648 | 1/1973 | Clifford | 285/321 |
| 3,754,780 | 8/1973 | Pogonowski | 285/421 |
| 3,884,510 | 5/1975 | Bram | 285/321 |
| 3,941,410 | 3/1976 | Miyaoka | 285/321 |

*Primary Examiner*—Dave W. Arola
*Attorney, Agent, or Firm*—Joseph W. Farley

[57] ABSTRACT

A joint connecting the plug of one pipe to the socket of another pipe and permitting relative axial movement between the pipes includes a step surface formed on the end of the plug and engageable by a split lock ring fitted into an annular groove formed in the inner surface of the socket. The lock ring is contractable into fitted relation with the plug and is provided at its ends with overlapping portions engageable by a retaining member insertable through the clearance between the socket and plug to maintain the lock ring in contracted position. The overlapping portions are preferably provided on separate pieces adjustably mounted on the ends of the split lock ring. A jig, insertable through the clearance between the plug and the socket into engagement with the ends of the lock ring, is provided for contracting the lock ring prior to the insertion of the retaining member.

10 Claims, 12 Drawing Figures

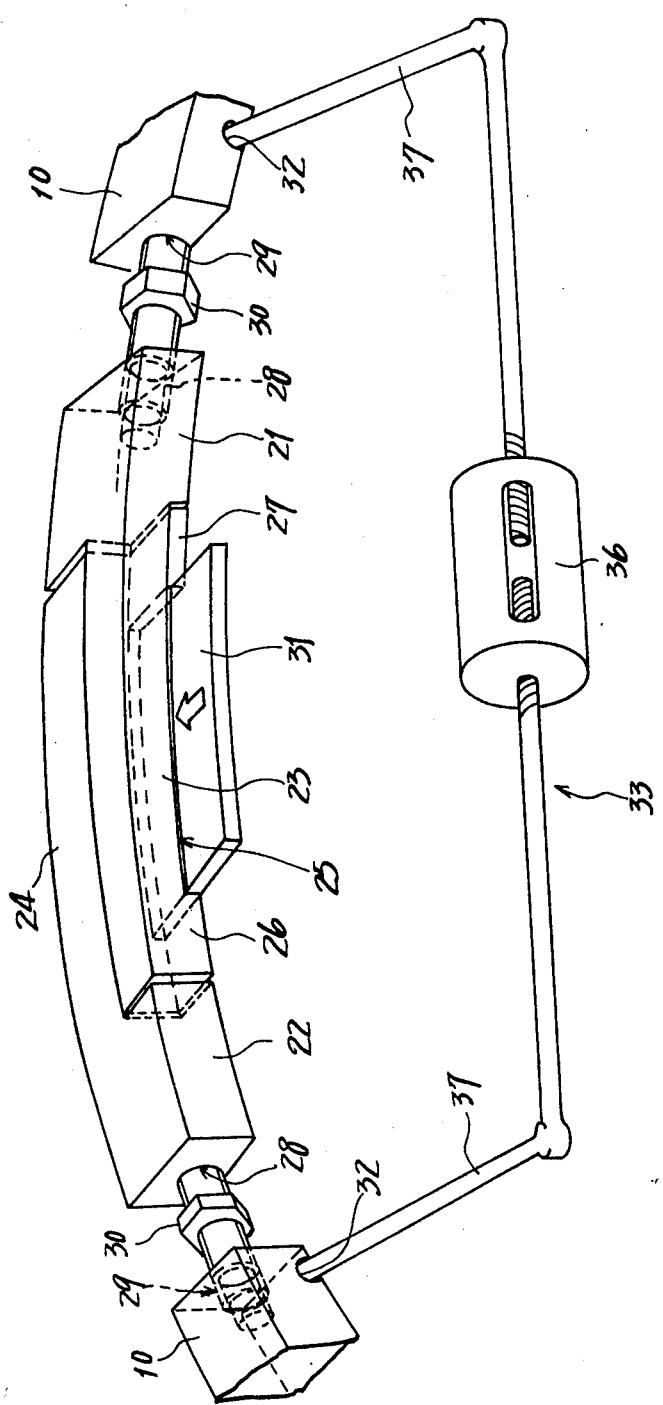

SEPARATION-PREVENTING PIPE JOINT CONSTRUCTION

The present invention relates to a separation-preventing pipe joint construction, particularly of the type wherein the socket portion of one pipe receives the plug portion of the other pipe with an annular space defined therebetween into which a sealing material is forced so as to define a seal part and wherein a split lock ring fitted in an annular groove formed in the inner surface of said socket is engageable axially of the pipe with a slip-off preventing projection provided on the outer surface of the plug end portion, thereby defining a lock part.

Pipe joint constructions of this type include the one disclosed in U.S. Pat. No. 3,941,410 and comprising an annular groove formed circumferentially in the inner peripheral surface of said socket portion and spaced inwardly from the axially outer end thereof, a plurality of circumferentially spaced threaded openings extending radially between the bottom of said annular groove and the outer peripheral surface of the sprocket portion, a split lock ring fitted in said annular groove, screw means engaged in said threaded openings to urge said lock ring against the elasticity thereof toward the pipe axis and to decrease the lock ring diameter, a step surface extending radially outwardly from the outer peripheral surface of said plug portion and adapted to be disposed axially inwardly of the socket portion from the lock ring position, the arrangement being such that when said lock ring is decreased in diameter by said screw means so that the inner periphery of the lock ring projects from the annular groove, said step surface of the plug portion can engage the inner lateral surface of said lock ring to limit axial separating movement between the pipes, a sealing member, and means for compressing the sealing member into an annular space bounded by the inner surface of the socket portion, the outer lateral surface of the lock ring and the outer surface of the plug portion.

According to the above construction, there is the danger of the liquid escaping to the outside through the clearances between said screws and the threaded holes. To prevent this leakage, it may be contemplated to replace said screws by headless screws so that they can be completely screwed into the threaded holes while sealing threaded bodies are used which are then screwed into the entrance portions of the threaded holes to thereby seal said threaded holes.

The pipe joint construction described above, however, has many disadvantages from the standpoint of production costs and pipe fitting operation in that since a large number of threaded holes have to be provided, the labor and time involved in forming the socket is increased and that since a large number of screws have to be used, much labor and time is involved in joining the pipes together while the number of parts is also increased.

A principal object of the present invention is to provide a separation-preventing pipe joint construction wherein said lock ring can be effeciently contracted and maintained in such contracted condition, the plug can be positively prevented from slipping off the socket, and there is no danger of the leakage of the fluid in the pipeline. Further, the invention also provides a pipe joint construction having a earthquake proof function and effective for use in piping in soft ground, wherein in the jointed condition of the socket and plug, there is some flexibility and the socket and plug are relatively movable axially of the pipe in a fixed range, that is, they are capable of bayonet movement in a fixed range and yet prevented from slipping off each other.

Thus, a pipe joint construction according to the present invention, comprising a seal part defined by a packing pressed between the socket and plug, and a slip-off preventing part defined by a split lock ring fitted in an annular groove formed in the inner surface of the socket and engageable with an engagement step surface formed on the front end outer surface of the plug, is characterized in that the opposite ends of said split lock ring are provided with overlap portions adapted to overlap each other axially of the pipe and a retaining member which will engage the opposite ends of the split lock ring when said opposite ends are drawn together is inserted into the split lock ring through a clearance between the socket and the plug to cause the split lock ring to be tightly fitted over the plug.

According to such arrangement of the invention, it is no longer necessary to provide threaded holes extending from the bottom of the annular groove to the outer surface of the socket for contracting the split lock ring, so that the manufacture of the socket is simple. Further, when the retaining member is inserted through the clearance between the socket and plug with the opposite ends of the split lock ring drawn together, the inner periphery of the split lock ring and the engagement step surface are ready for engagement with each other axially of the pipe, so that the plug can be positively prevented from slipping off the socket. Moreover, the joining operation is simple.

According to a preferred embodiment of the invention, the inner end of the socket is provided with a plug abutment step surface against which the front end surface of the plug abuts, and the above-mentioned annular groove and said plug abutment step surface are spaced apart from each other a distance corresponding to the distance between the above-mentioned engagement surface and the front end of the plug plus a distance which allows axial movement between the socket and the plug.

According to such arrangement, since the axial movement between the socket and the plug in a fixed range is allowed in the jointed condition of the socket and plug, upon occurrence of an earthquake, the expansive and contractive forces exerted on the pipeline by the movement of the ground and by the friction between the ground and the pipeline can be absorbed by the axial movement of the pipe joint concomitant with the movement of ground, so that there is no longer the danger of excessive expansive and contractive forces being concentrated on the weaker pipe joint to the extent that the latter is damaged, as in the case of an arrangement which does not allow such axial movement. Moreover, since there is no possibility of the plug completely slipping off the socket, the pipeline itself remains as it is. Further, if an amount of movement of ground exceeding the allowable range of axial movement of pipe joint takes place in one pipe joint, the movement of one pipe joint in the pipeline caused in accordance with the excess of ground movement transmits the expansive and contractive forces due to the ground movement to the next pipe joint where part of said excess is absorbed by the axial movement thereof, the rest of said excess being then transmitted to and absorbed by the successive pipe joints in the pipeline, so that the concentration of external forces will not occur.

Therefore, the safety of the pipeline is assured even against a big earthquake attended with a considerable movement of ground. For the same reason, it is also evident that the pipe joint construction is effective for piping in weak ground.

According to a desirable embodiment of the present invention, at least one end of said split lock ring has a connection piece mounted thereon through a distance adjuster, said connection piece being formed with said overlap portion.

According to such arrangement, since the allowance in the outer peripheral length of the plug and in the length of the lock ring can be easily absorbed by said distance adjuster, the opposite ends of the split lock ring can be engaged with each other by simply inserting the retaining member at the time of setting of the lock ring, and the lock ring can be retained in the condition of being intimately fitted over the plug, with the efficiency of fitting operation increased.

Other features and merits of the present invention will be readily understood from preferred embodiments of the invention to be presently described with reference to the accompanying drawings.

DESCRIPTION OF THE DRAWINGS

FIG. 2 is a perspective view showing the operation involved in setting a lock ring in the construction of FIG. 1;

DESCRIPTION OF THE PREFERRED EMBODIMENTS

Figure 1:
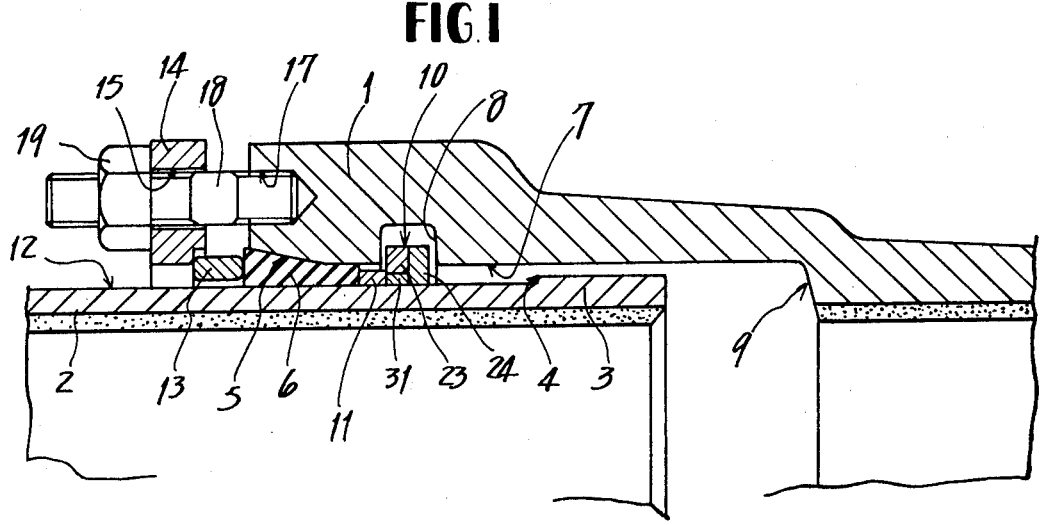
FIG. 1 is a side view in longitudinal section of a first embodiment of the invention, showing the principal portions in assembled condition.
Figure 3A:
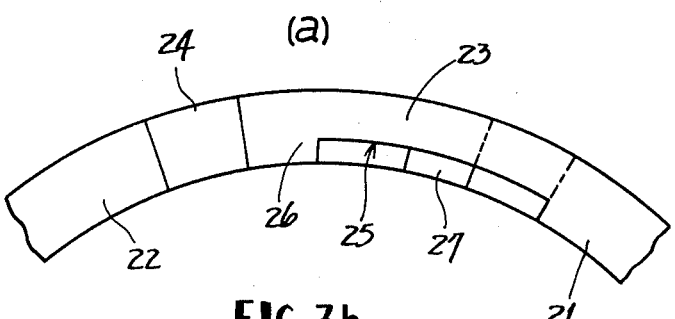
FIG. 3a is a front view of overlap portions at the opposite ends of the split lock ring.

In FIGS. 1 through 3, the numerals 1 and 2 designate a socket and a plug, respectively. The front end outer surface of the plug 2 is provided with an engagement projection 3 of increased diameter to form a slip-off preventing engagement step surface 4 which faces axially of the pipe. The open end inner surface 5 of the socket 1 is a tapered surface for positioning of a seal packing 6 which is outwardly divergingly inclined. At a suitable distance inwardly spaced from the tapered surface 5, there is provided an annular groove 8 formed circumferentially in the inner surface 7 of the socket. Designated at 9 is a plug abutment step surface formed in the innermost part of the socket 1, the distance between said annular groove and said plug abutment step surface being equal to the width of the engagement projection 3 plus a suitable distance. Designated at 10 is a split lock ring split at one place so as to be variable in diameter, the size of its cross-section being such that it can be just received in said annular groove 8. When the split lock ring is contracted against its resiliency and inserted into the socket 1, it can be fitted in the annular groove 8 by its expansive action due to its resilient return movement. Designated at 11 is a backing-up ring of hard rubber or the like for protecting the seal packing 6. Thus, by expanding the backing-up ring, it can be brought beyond the engagement projection 3 and fitted over the outer surface 12 of the plug. The seal packing 6 is wedge-shapped in cross-section, having a tapered portion for abutment against the socket tapered surface 5. Thus, by expanding the seal packing against its resiliency, it can be brought beyond the engagement projection 3 and fitted over the outer surface 12 of the plug. Designated at 13 is a relay ring divided into a plurality of arcs or split at one place in the circumference, one end surface thereof being sized for abutment against substantially the entire outer end surface of the seal packing 6. Designated at 14 is a gland having an inner diameter allowing it to pass over the engagement projection 3 and engage the relay ring 13, said gland having circumferentially equispaced bolt insertion holes 15. Designated at 18 is a stud bolt screwed into a threaded hole 17 in the end surface of the socket 1 so as to extend through said bolt insertion hole 15, with a nut 19 threadedly carried thereon for urging the gland 14 toward the socket 1.

Figure 3B:
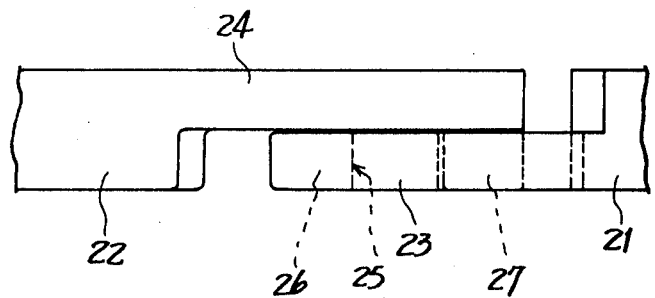
FIG. 3b is a plan view of the same.

The split lock ring 10, as shown in FIG. 2, has connection pieces 21 and 22 attached to the opposite ends thereof. As the shapes of the connection pieces 21 and 22 are clear from FIGS. 2 and 3, the width of the front end portion of each connection piece is reduced to about half the width of the remaining portion, so that the connection pieces are formed with overlap portions 23 and 24 which overlap each other laterally (i.e., axially of the pipe). Of said overlap portions 23 and 24, one 23 has a notch 25 of suitable length formed in the inner surface thereof, thereby defining an engagement portion 26 located forwardly of said notch 25. The front end of the over overlap portion 24 has an engagement portion 27 projecting laterally therefrom and adapted to be fitted in said notch 25 so that the engagement portions 26 and 27 may be circumferentially opposed to each other. Further, the base end surfaces of the connection pieces 21 and 22 are each formed with a threaded hole 28, while the opposite ends of the lock ring 10 are each formed with a threaded hole 29. Adjusting bolts 30 serving as distance adjusters are screwed into the threaded holes 28 and 29, whereby the connection pieces 21 and 22 are attached to the lock ring 10. In addition, in the threaded holes 28, 29 and the adjusting bolts 30, the threaded holes 28 and 29 are opposite in their threading direction to each other so that when the adjusting bolts 30 are turned in one or the other direction, the distances between the connection pieces 21, 22 and the lock ring 10 can be adjusted in a turnbuckle fashion. This is effective to absorb the allowance in the length of the outer periphery of the plug and in the length of the lock ring 10. When the connection pieces 21 and 22 are in the condition of being attached to the lock ring 10, the overlap portions laterally overlap each other, and when they are in free condition, the degree of overlap is low, as shown in FIG. 3b, the arrangement being such that when they are drawn toward each other so as to completely overlap each other, they are intimately fitted over the outer surface of the plug 2 and in this condition a retainer 31 is then inserted between the two engagement portions 26 and 27, as shown in FIG. 2, thereby retaining the intimate fitting condition. Further, the opposite ends of the lock ring are provided with openings 32 for receiving a jig 33 to be later described.

Figure 7:
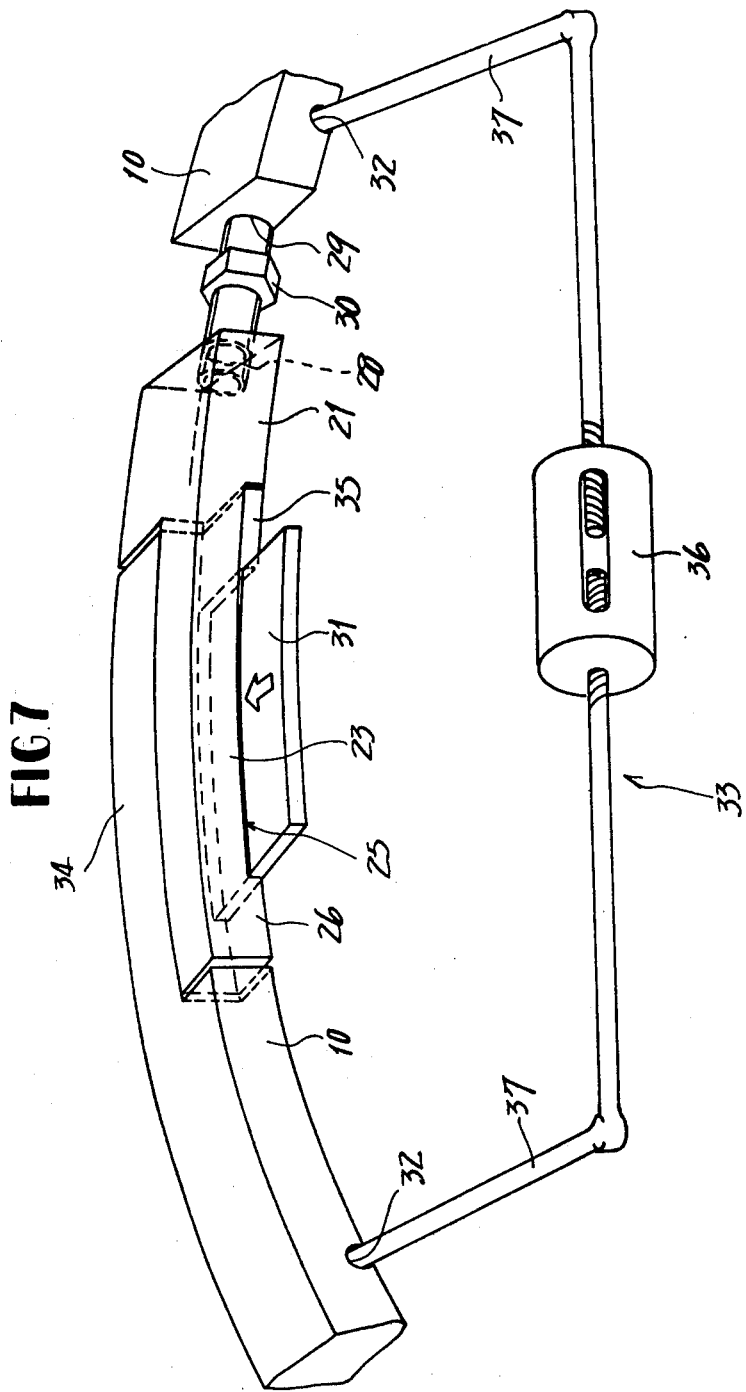
FIGS. 7 through 9 are views similar to FIG. 2, showing other modifications of the split lock ring.

In addition, in the above embodiment an arrangement has been shown in which connection pieces are attached to the opposite ends of the split lock ring 10. However, when only the function of absorbing the allowance in the peripheral length is considered, as shown in FIG. 7, one connection piece 21 may be attached to only one end of the split lock ring 10 while the other end of the split lock ring may then be formed directly with an overlap portion 34 and an engagement portion 35 corresponding to the overlap portion 24 and engagement portion 27 of said connection piece 22. However, the overlap portions 23, 24 and 34 having the notch 25 and engagement portions 26, 27 and 35 are the weakest points in the lock ring 10, and since the split lock ring, as considered from its positional relation, is subjected to the pipeline fluid and can be corroded thereby, the overlap portions 23, 24 and 34 are what needs consideration from the standpoint of materials. Thus, as shown in FIGS. 1 through 3, it is desirable that connection pieces 21 and 22 be attached to the opposite ends of the lock ring 10 and that such connection pieces, distance adjusters and the retainer 31 be made of a stainless steel. In addition, the lock ring 10 itself is made usually of ductile cast iron, which is the same material as that of the pipes.

The connection between the socket 1 and the plug 2 is carried out in the following sequence: First of all, the allowance in the length of the outer periphery of the plug and in the length of the lock ring 10 is absorbed by the adjusting bolts 30 in the manner described above, whereupon the lock ring 10 is inserted into the annular groove 8 and then the plug 2, on which the gland 14, relay ring 13, seal packing 6 and backing-up ring 11 have been fitted in advance, is inserted into the socket 1 through the lock ring 10. In this condition, a substantially U-shaped jig 33 having a centrally located turnbuckle 36 is used, with the ends of the connecting rods 37 of said jig 33 inserted into the holes 32 in the lock ring 10, and the turnbuckle 36 is turned to draw the connecting rods 37 toward each other, thereby contracting the lock ring 10 against its resiliency to intimately fit the lock ring over the outer surface of the plug 2 while causing the overlap portions 23 and 24 of the connection pieces 21 and 22 to completely overlap each other. In this condition, the retainer member 31 sized to the distance between the two engagement portions 26 and 27 in the notch 25 is driven between said portions, whereupon the jig 33 is removed. Thus, the insertion of the retainer member 31 maintains the lock ring 10 in the condition in which it is intimately fitted over the plug 2, and the lock ring will cooperate with the engagement projection 3 to prevent the slipping-off of the plug 2. Next, the backing-up ring 11 and packing 6 are inserted through the clearance between the socket 1 and the plug 2 and the relay ring 13 is placed against the back of the packing 6 and the gland 14 is placed against the back of the relay ring 13. The stud bolts 18 are then inserted into the bolt insertion holes 15 in the gland 14 and the nuts 19 are tightened to exert a pressure on the packing 6 to define a seal part, whereupon the connecting operation is completed.

Figure 4:
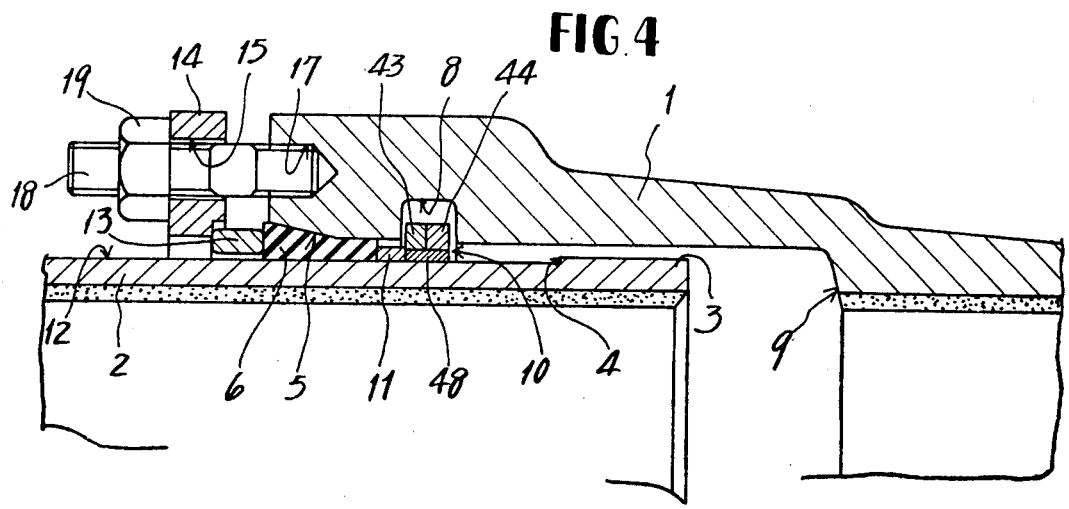
FIG. 4 is a view similar to FIG. 1 showing a second embodiment of the invention.
Figure 6A:
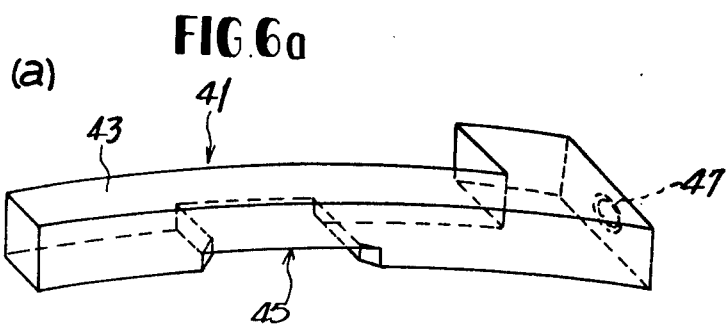
FIGS. 6a, 6b and 6c are perspective views of the connection pieces and the retaining member shown in FIG. 5.
Figure 6B:
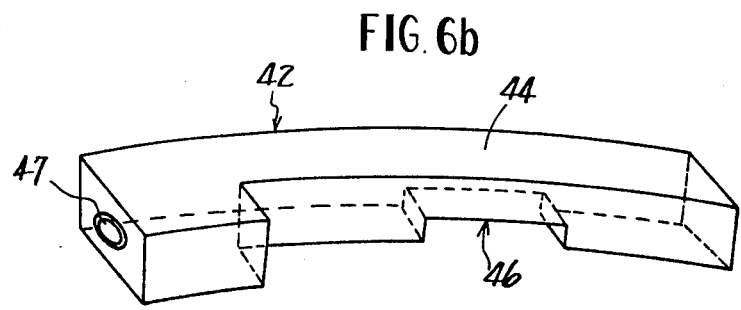
Figure 6C:
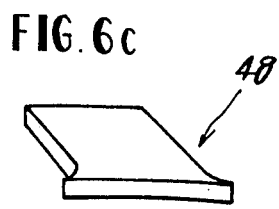
Figure 5:
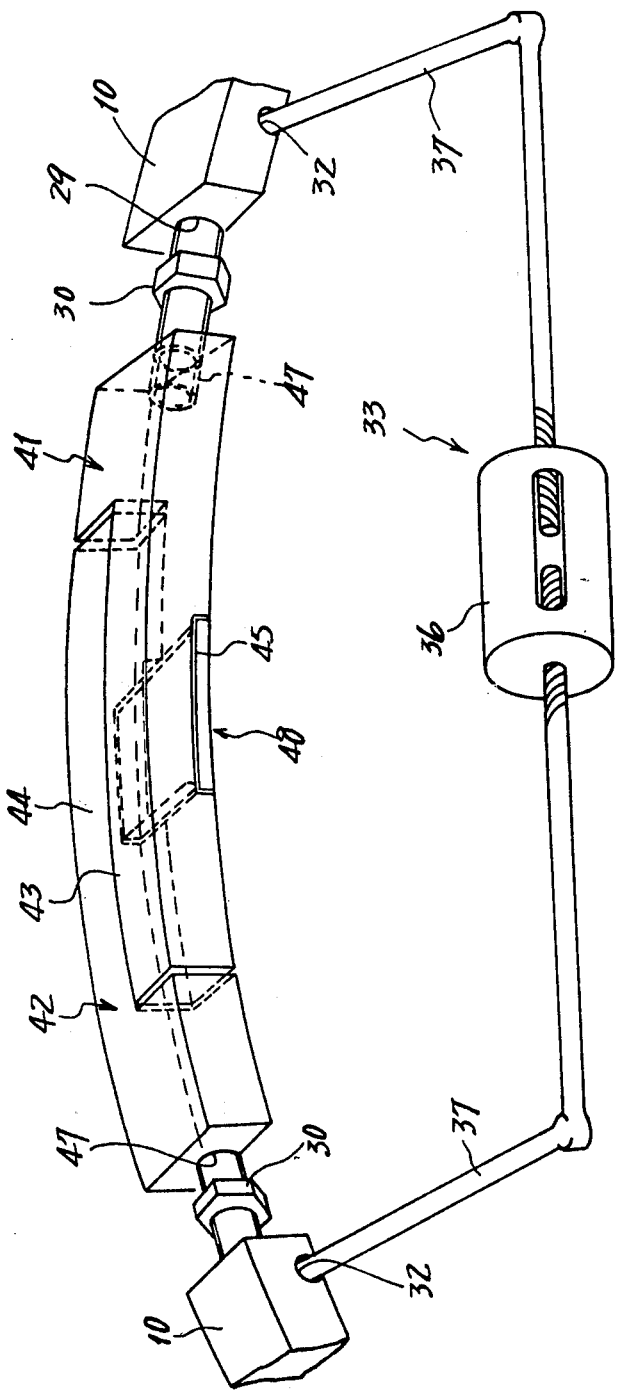
FIG. 5 is a view similar to FIG. 2 for the construction of FIG. 4.

A second embodiment will now be described with reference to FIGS. 4 through 6. This arrangement is of the same construction as the first embodiment except the split lock ring 10. Therefore, like parts are designated by like reference characters and a description thereof is omitted. The split lock ring 10 in this second embodiment has connection pieces 41 and 42 attached to the opposite ends thereof, as shown in FIG. 5. As the shapes of the connection pieces 41 and 42 are clear in FIGS. 6a and 6b, the lower surfaces of their overlap portions 43 and 44 of smaller width are provided with engagement grooves 45 and 46, respectively, and their base ends are formed with threaded holes 47. On the other hand, the opposite ends of the lock ring are formed with threaded holes 29, and adjusting bolts 30 serving as distance adjusters are screwed into said threaded holes 29 and into the threaded holes 47 in said pieces 41, 42, whereby the pieces 41 and 42 are attached to the lock ring 10. Thus, the plug outer diameter allowance and lock ring length allowance are absorbed by the adjusting bolts 30, as in the first embodiment. When the pieces 41 and 42 are in the condition of being attached to the lock ring 10, the overlap portions 43 and 44 overlap each other axially of the pipe, and when the split lock ring 10 is in free condition, the degree of overlap is low, and it is when the opposite ends of the split lock ring 10 are drawn toward each other to intimately fit the split lock ring over the outer surface 12 of the plug that the engagement grooves 45 and 46 of the pieces are aligned with each other. By inserting a retainer member 48 as shown in FIG. 6c into the thus aligned grooves, the condition of the split lock ring being intimately fitted over the plug 2 is maintained with its opposite ends engaged with each other.

Figure 8:
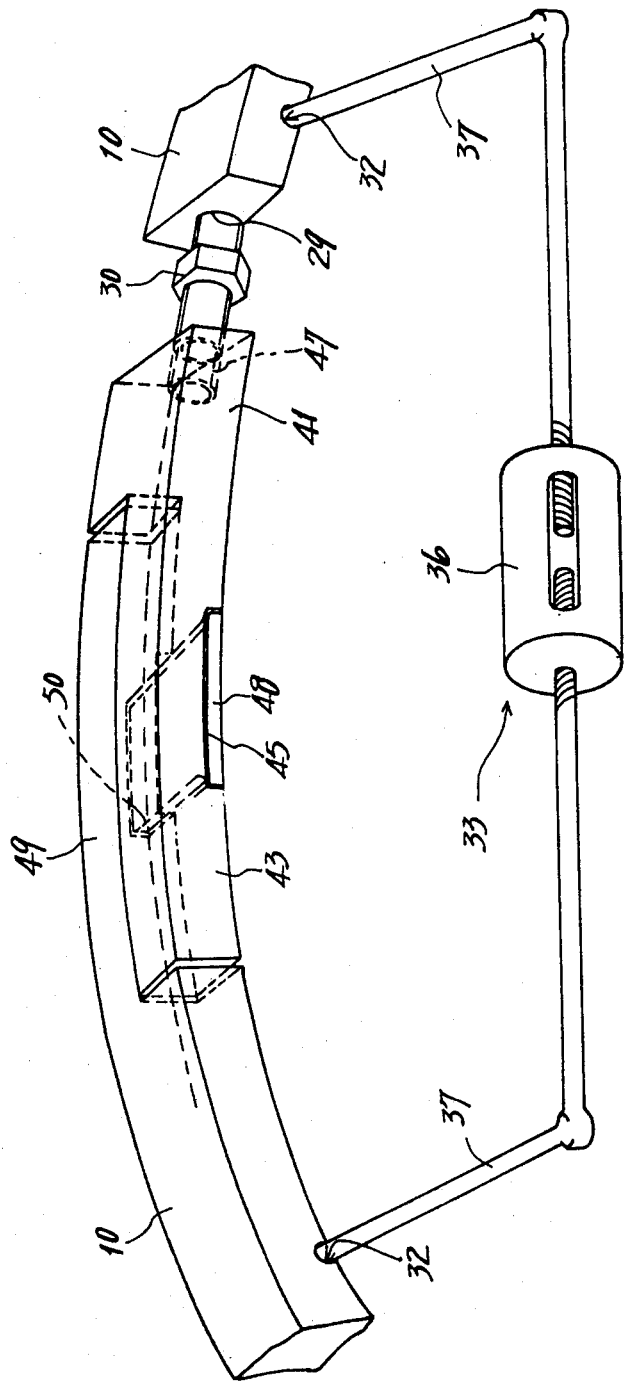

In this second embodiment also, as shown in FIG. 8, only one end of the split lock ring may have one connection piece 41 attached thereto and other end may then be formed with an overlap portion 49 and an engagement groove 50.

Figure 9:
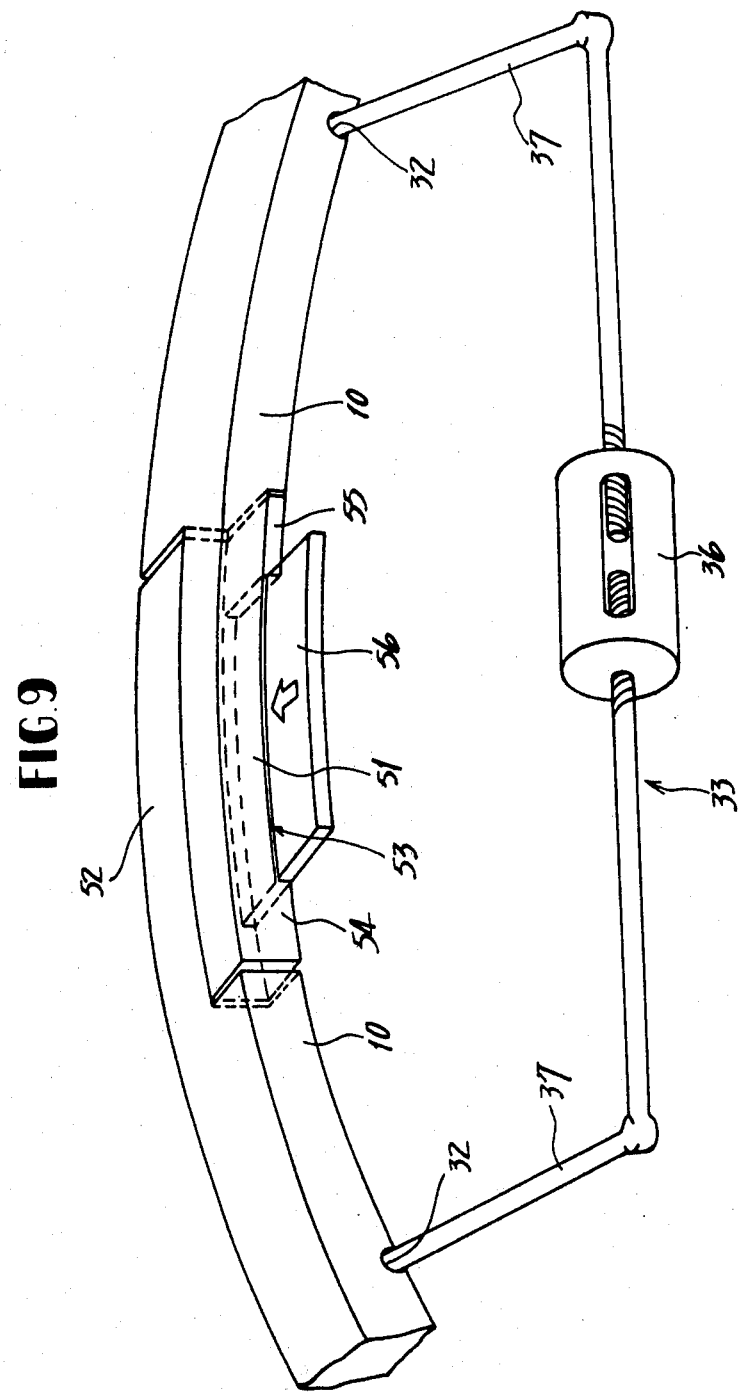

Further, as shown in FIG. 9, the connection pieces 21, 22, 41 and 42 may all be omitted and instead the opposite ends of the split lock ring 10 may be formed directly with overlap portions 51 and 52. In that case, as shown in FIG. 9, the inner surface of one overlap portion 51 is formed with a notch 53 of suitable length terminating at its front end in an engagement portion 54 while the front end of the other overlap portion 52 is formed with a laterally projecting engagement portion 55 adapted to be inserted into said notch 53 so that the engagement portions 54 and 55 are circumferentially opposed to each other, with a retainer member 56 inserted between the engagement portions 54 and 55, as in the engaging arrangement shown in the first embodiment. In the case where no distance adjuster is used as in FIG. 9, it should be noted that in order to intimately fit the split lock ring 10 over the plug 2, the plug outer diameter allowance and lock ring length allowance should be negligibly small. Actually, however, such narrow allowance can hardly be assigned. In such case, with the embodiment of FIG. 9, the allowances can be relatively easily absorbed by adjusting the length of the retainer member 56 prior to insertion thereof. In certain circumstances, however, the engaging arrangement shown in the second embodiment would be employed.

We claim:

1. In a separation-preventing joint between the plug of one pipe and the socket of another pipe, including sealing means defined by a packing pressed between the plug and socket, and slip-off preventing means comprising a split lock ring fitted in an annular groove defined by wall means in the inner surface of the socket and engageable with a step surface formed on the front end surface of the plug, the plug and socket having radial clearance therebetween; the improvement wherein the opposite ends of said split lock ring are provided with overlap portions adapted to overlap each other axially of the pipes, at least one of said overlap portions being formed on a connection piece separate from said split lock ring, means attaching said connection piece to one end of said split lock ring for adjustment circumferentially of said split lock ring, and retaining means insertable through the radial clearance between said socket and plug into engagement with said overlap portions for maintaining said lock ring in said groove and in contracted fitted relation with said plug so that said lock ring will abut said wall means and step surface upon attempted separation of the joint.

2. A joint construction as set forth in claim 1 further including contracting means insertable through the radial clearance between said socket and plug for contracting said split lock ring.

3. A joint construction as set forth in claim 1 further comprising socket means provided on said split lock ring adjacent the opposite ends thereof and engageable axially of the pipes for drawing the split lock ring into contracted fitted relation with said plug.

4. A joint construction as set forth in claim 3 further including contracting means insertable through the radial clearance between said socket and plug for engaging said socket means.

5. A joint construction as set forth in claim 1, wherein the innermost end portion of the socket is provided with a plug abutment step surface against which the front end surface of the plug abuts, the distance between said annular groove and said plug abutment step surface being equal to the distance between said engagement step surface and the front end of the plug plus a distance which allows axial movement between the socket and the plug.

6. A joint construction as set forth in claim 1, wherein said overlap portions at the opposite ends of said split lock ring are formed with engagement portions which are circumferentially opposed to each other, and said retaining means comprises a retaining member inserted between said engagement portions.

7. A joint construction as set forth in claim 1, wherein the inner surfaces of said overlap portions at the opposite ends of said split lock ring are provided with engagement grooves so that when the split lock ring is drawn into fitted relation with the outer surface of the plug, a groove is defined extending through said overlap portions, and said retaining means comprises a retaining engagement member inserted into said groove.

8. A joint construction as set forth in claim 1, wherein said connection pieces, attaching means and retaining means are made of a stainless steel.

9. A joint construction as set forth in claim 1, wherein said step surface is formed by an engagement projection formed on the front end outer surface of the plug.

10. A joint construction as set forth in claim 1, wherein said overlap portions are each formed on a connection piece separate from said split lock ring, and means attaching said connection pieces to the ends of said split lock ring for adjustment longitudinally of said split lock ring.

* * * * *